United States Patent
Yumoto

[11] 3,842,523
[45] Oct. 22, 1974

[54] VARIABLE PICTURE DEVICE

[76] Inventor: Hirokazu Yumoto, No. 1-11, 2-chome, Sumida, Sumida-ku, Tokyo, Japan

[22] Filed: Aug. 21, 1973

[21] Appl. No.: 399,318

Related U.S. Application Data

[63] Continuation of Ser. No. 176,481, Aug. 31, 1971, abandoned.

[30] Foreign Application Priority Data

Dec. 11, 1970  Japan.............................. 45-123670

[52] U.S. Cl............................ 40/65, 40/78, 273/138
[51] Int. Cl............................................... G09f 11/30
[58] Field of Search ....... 40/68, 64 R, 65, 107, 109, 40/78.03, 78.07, 78; 273/138

[56] References Cited
UNITED STATES PATENTS

| 189,784 | 4/1877 | Prince............................ 40/78.03 X |
| 322,111 | 7/1885 | Kurschner............................. 40/68 |
| 623,164 | 4/1899 | Lamac .................... 40/68 |
| 2,256,433 | 9/1941 | Jackson et al. ....................... 40/107 |
| 3,680,867 | 8/1972 | Zimmerman..................... 40/107 X |

Primary Examiner—John H. Wolff

[57] ABSTRACT

A variable picture device includes a casing having two or more display windows which are provided on each plane thereof in symmetrical relation and along the diagonal line traversing across said surface and a sliding picture assembly comprising a plurality of sliding segments each divided into several sections corresponding to the numbers of the display windows for displaying the different pictures in a single plane. The sliding segments are aligned and superimposed in double stages except only one stage at the end portion so as to circulate in order by turning the casing at an angle of 180°.

4 Claims, 6 Drawing Figures 3,842,523

INVENTOR
HIROKAZU YUMOTO

BY

ATTORNEY

VARIABLE PICTURE DEVICE

BACKGROUND OF THE INVENTION

This application is a continuation of application 176,481 filed Aug. 31, 1971, now abandoned and relates to a variable picture device.

A typical variable picture device which is frequently encountered is a perspective view device in which two different pictures are drawn on a single crude surface so that viewers can see one of the two pictures depending on the angle of view. However, in this type of device, either the angle of the device or the viewing position of the viewer must be changed for the viewer to see the different picture.

Another variable picture device, which is frequently used in advertising display, includes a number of rotatable plates, However, a device of this type is usually extremely large, and therefore not often used, excepting for advertising display.

SUMMARY OF THE INVENTION

It is therefore a general object of the present invention to provide a variable picture device by which different indicia such as pictures, photographs, designs, letters or the like, herein referred to as "pictures," may be viewed in a single plane by merely turning the device about a predetermined axis.

In accordance with the present invention, the variable picture device comprises a substantially rectangular and flat casing having two or more display windows provided on each surface thereof in symmetrical relation and preferably along the diagonal line traversing across said surface area and a sliding picture assembly including a plurality of sliding segments each divided into several sections corresponding to the numbers of the display windows for displaying the different pictures. The sliding segments are aligned and superposed in double stages excepting for the single end segment whereby to permit the segments to be moved in a predetermined sequence within a chamber defined by the casing, by turning the casing at an angle of 180° between upper and lower planar walls thereof; i.e., the casing is turned at an angle of 180° for displaying indicia or pictures through the display windows.

These and other objects of the present invention will become apparent as the description proceeds in particular reference to the accompanying drawings in which:

Figure 1:
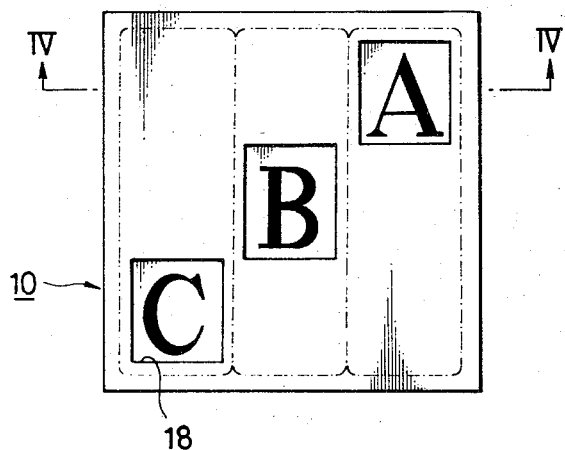
FIG. 1 is a plan view of the casing of the device of the invention providing three display windows in a single plane thereof.

DESCRIPTION OF THE PREFERRED EMBODIMENTS:

Referring now in more detail to the drawings, wherein like parts are indicated by like reference numerals, a variable display device comprises a casing 10 and a sliding picture assembly 12.

Figure 4:
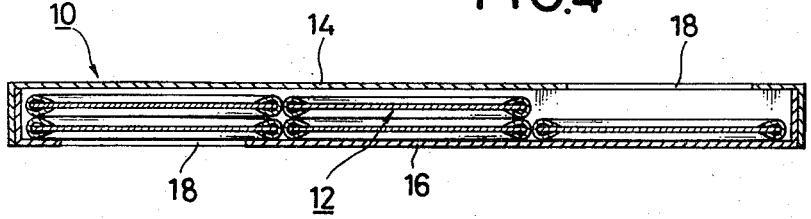
FIG. 4 is a cross sectional view of the device of the invention taken along the line IV—IV of FIG. 1 with a picture sliding assembly accomodated therein.

As best shown in FIG. 4, the casing 10 comprises an upper vessel 14 having a U-shaped cross section and a lower vessel 16 also having a U-shaped cross section, the lower vessel 16 being dimensioned relative to the upper vessel to permit fitting thereof within the upper vessel in inverted relation thereto to define a closed chamber. Both vessels are customarily made of the same materials such as card board, synthetic resin or the like and fixed in assembled relation by a suitable bonding agent.

Figure 2:
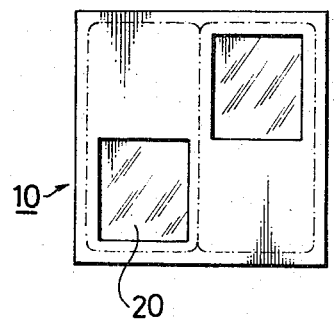
FIG. 2 is a plan view of the casing of another embodiment providing two display windows in a single plane thereof.
Figure 3:
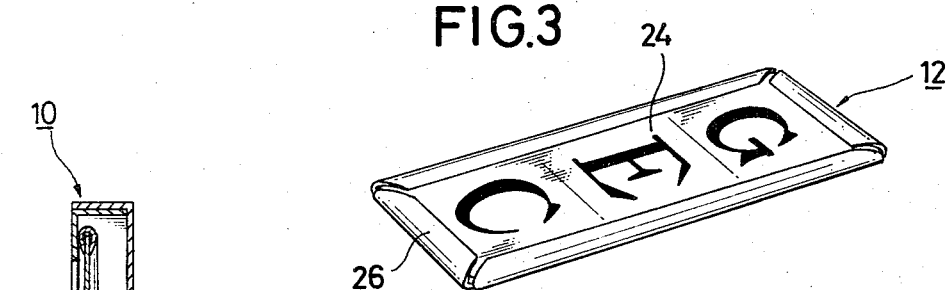
FIG. 3 is a perspective view of a sliding segment in accordance with the present invention.

The vessels 14 and 16 are provided in their planar base portions of their U-shaped cross sections with two or more display windows 18 in symmetrical relation for displaying the different pictures by turning the casing 10 as more fully described hereinafter. The display windows 18 are recessed in each plane of the vessels and preferably along a diagonal line across each of the planar base portions as best shown in FIG. 1 and 2. The display window 18 is preferably covered by a transparent sheet 20, which may be "cellophane" (R.T.M.), vinyl or the like.

Figure 5:
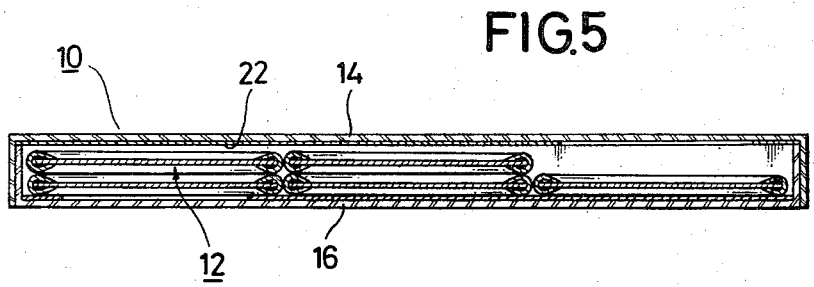
FIG. 5 is a cross sectional view of a device similar to FIG. 4 but showing the casing made of transparent material and lined with an opaque material.

In another embodiment shown in FIG. 5, both the upper and lower vessels are made of the transparent material such as transparent plastic at least at the base portions and each of the inner surfaces thereof facing the chamber is coated or lined with an opaque screen 22 leaving the display windows transparent. The opaque screen may be a suitable paint or metallic powder which is applied to the chamber facing side of the base portions of each vessel or may be a suitable paper or cloth to be lined. In accordance with this embodiment, the transparent sheet used in the first embodiment may omitted.

As hereinbefore described, the display windows are preferably arranged along a diagonal line traversing across the base portion of each vessel so that a series of different pictures may be seen as shown in FIG. 1. It will be appreciated that the display windowos may be arranged in an irregular manner to display the different pictures within a single plane. However, if two or more display windows are provided on the same vertical or horizontal line, the same picture will be displayed repeatedly with reduced interest on the part of the viewer, notwithstanding such the irregular arrangement may have special utility for example for study by a child.

Referring now to FIG. 5, the sliding segment 12 is comprised of a picture sheet and a peripheral edge portion thereof is covered with a rounded frame 26 of synthetic resin for facilitating sliding movement of one segment onto and with respect to another segment.

The picture sheet is divided into two or more sections 24 and will be equal in number to that; of the display windows used. individual sections may contain different pictures.

Figure 6:
FIG. 6 is a cross sectional view of a device similar to FIG. 4 but showing the casing displaced 90° from the FIG. 4 position.

As shown in FIGS. 4 and 5, the sliding picture segments are superimposed in double stages except excepting for the one stage segment at the end of the assembly. When the device is displaced 90 degrees after viewing the first pictures (compare FIG. 4 and FIG. 6), the segments slide as shown in FIG. 6 in section and when the device is again displaced 90 degrees i.e. 180 degrees from the original position, the sliding segments will be related as shown in FIG. 4 or 5. In this way, the sliding segments move step by step within the chamber of the casing thereby displaying for view the different pictures through predetermined windows symmetrically arranged on the base portions of each of the vessels 14, 16 of the casing.

A number of the variable display devices according to the invention may be bound in book form, especially a book for use by a child. However, they can be also used for educational, artistic and playing purposes.

What I claim is:

1. A portable variable display device comprising a casing constituted of first and second rectangular receptacles, each being open ended and each having a planar base of substantially equal length and width and upstanding walls of a height substantially smaller than the length of said base, one of said receptacles being assembled in nested and in inverted relation to the other so that the base of said one of said receptacles is spaced from the base of the other receptacle to define a single uninterrupted chamber, display windows formed in the base of each receptacle at predetermined regions thereof to permit viewing of indicia, first means lying in a first plane and movable within said chamber and comprising a first plurality of a predetermined number, greater than two, of movable elongate rectangular planar members bearing indicia for displaying said indicia through said display windows as said members are moved in said first plane within said chambers, each member having a length substantially greater than its width, said first plurality of members being disposed in side-by-side engaging relation in said chamber and occupying in said side-by-side relation substantially the full width of said uninterrupted chamber, each of said members having a length extending substantially the full length of said uninterrupted chamber, second means lying and movable in a second plane parallel to the first within said chamber and comprising a second plurality of movable elongate rectangular planar members bearing indicia for displaying said indicia through said display windows as said second plurality of members are moved in said second plane within said chamber, said second plurality of members being one less in number than said predetermined number, and being of like shape as said first plurality of members, said second plurality of members being disposed in side-by-side relation in said chamber in the same orientation as said first plurality of members and in superposed and sliding engagement therewith, said first and second plurality of members having opposite sides, each bearing indicia in regions corresponding to the locations of said display windows in the bases of each receptacle, said display windows being oriented along a diagonal of each base, said first and second plurality of members being laterally incrementally displaceable in said chamber within their respective planes in a predetermined number of steps, greater than two, by supporting said casing with the bases horizontally disposed and by manually rotating said casing thus disposed 180° about an axis extending parallel to the length of said bases, said casing prior and subsequent to said rotation thereof being supported on a planar horizontal supporting surface with one of its bases in engagement therewith and with the other base subject to view by a user of the display device.

2. A device according to claim 1, wherein each of the bases is formed with at least three symmetrically disposed diaplay windows, each member of said first and second plurality of members bearing three forms of indicia, each for viewing through one of the display windows as a function of location of said members within said chamber.

3. A device according to claim 2, wherein the casing is of opaque material, said display windows comprising cut-out sections in said material.

4. A device according to claim 2, wherein the casing is of transparent material and lined with opaque material excepting in those regions where said display windows are formed.

* * * * *